Oct. 30, 1951 — V. V. K. SUNDT — 2,573,166
AIR CHUCK

Filed April 9, 1947 — 4 Sheets-Sheet 1

INVENTOR.
Vigo von Krogh Sundt
BY
ATTORNEY.

Oct. 30, 1951     V. V. K. SUNDT     2,573,166
AIR CHUCK
Filed April 9, 1947     4 Sheets-Sheet 2
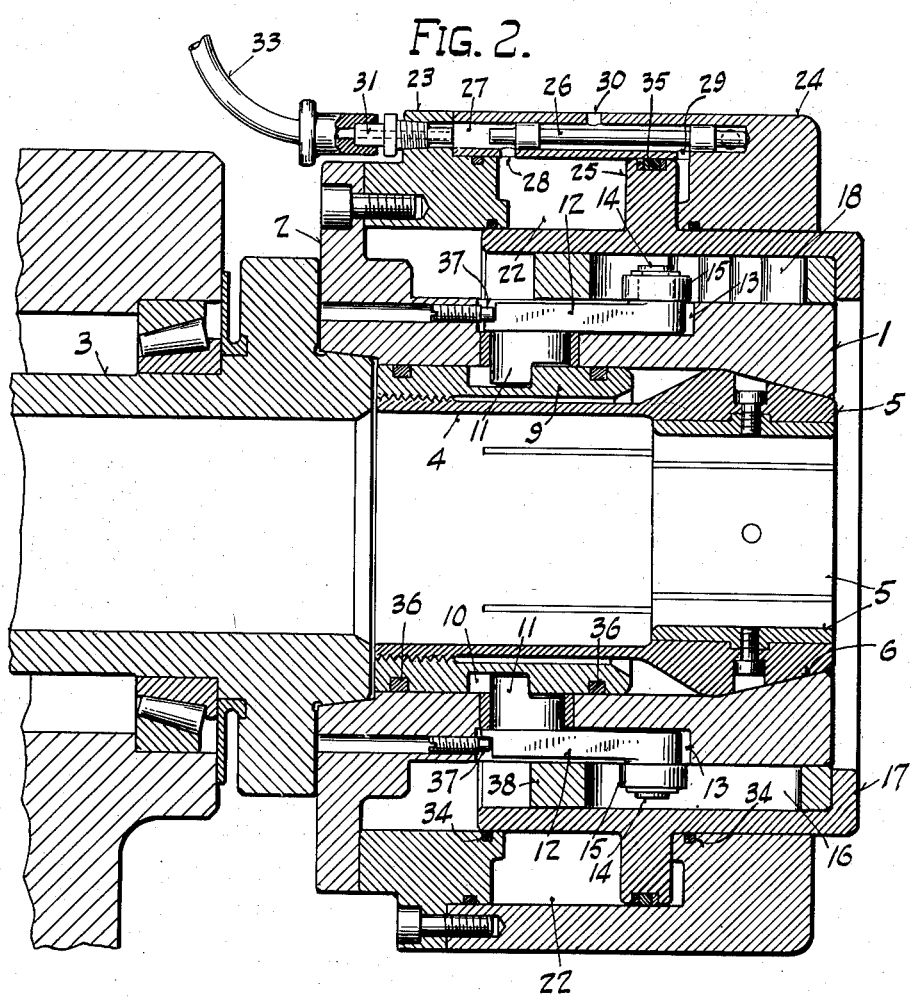
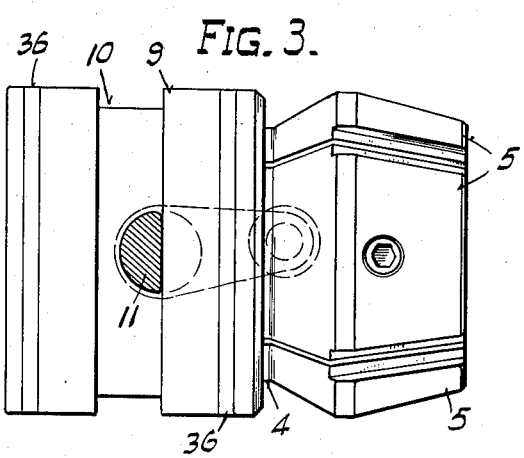
INVENTOR.
Vigo von Krogh Sundt
BY
ATTORNEY.

Oct. 30, 1951 V. V. K. SUNDT 2,573,166
AIR CHUCK
Filed April 9, 1947 4 Sheets-Sheet 3
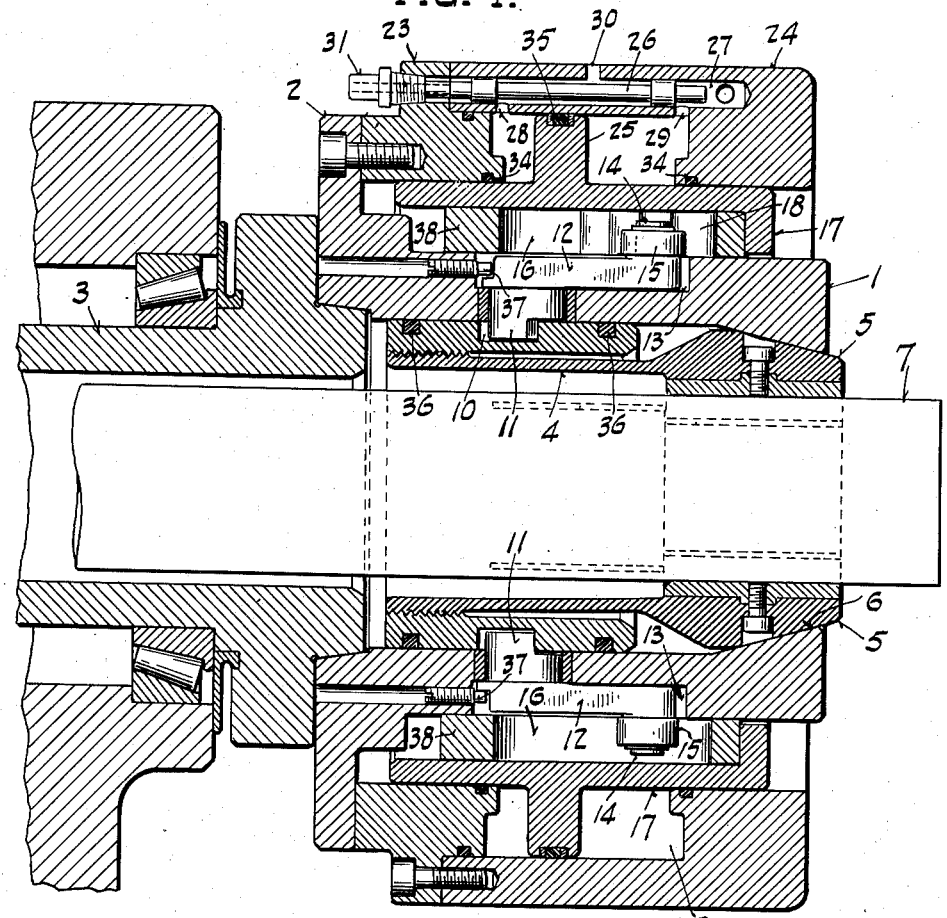
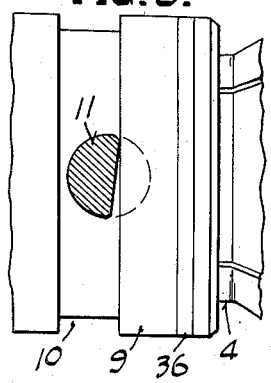
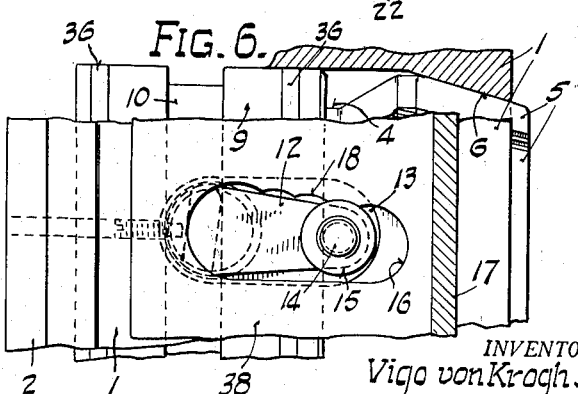
INVENTOR.
Vigo von Krogh Sundt
BY
ATTORNEY.

Oct. 30, 1951   V. V. K. SUNDT   2,573,166
AIR CHUCK
Filed April 9, 1947   4 Sheets—Sheet 4
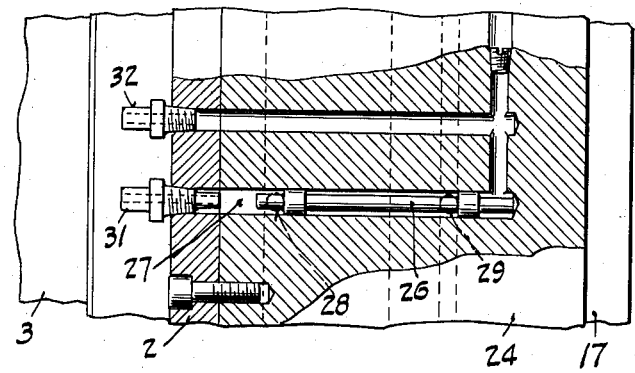
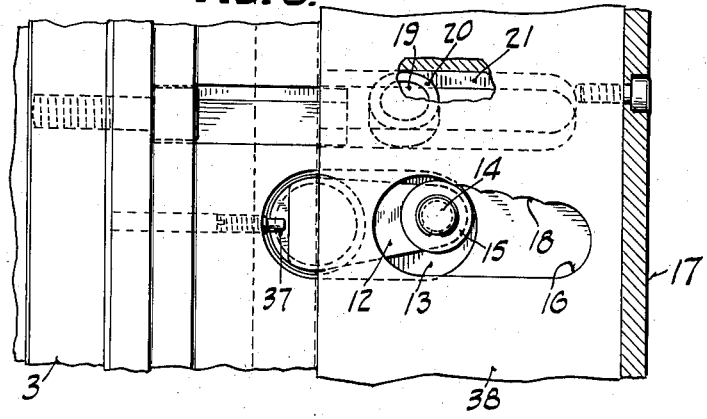
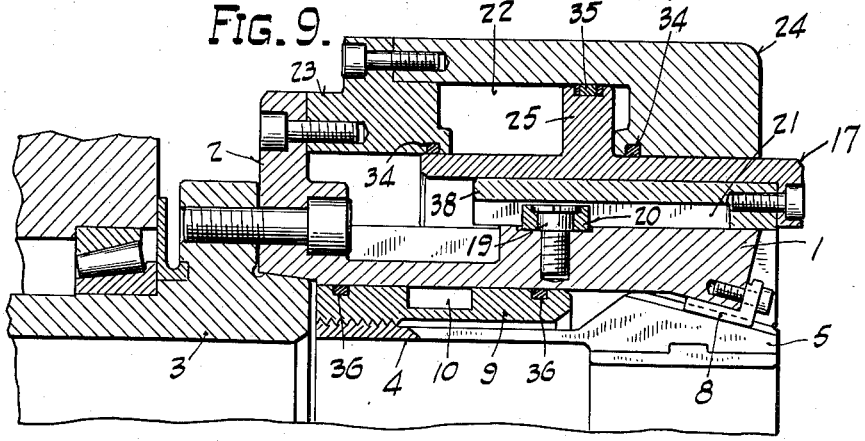
INVENTOR.
Vigo vonKrogh Sundt
BY
ATTORNEY.

Patented Oct. 30, 1951

2,573,166

UNITED STATES PATENT OFFICE 2,573,166

AIR CHUCK

Vigo V. Krogh Sundt, Madison, Wis., assignor to Gisholt Machine Company, Madison, Wis., a corporation of Wisconsin Application April 9, 1947, Serial No. 740,436

4 Claims. (Cl. 279—50)

This invention relates to an air chuck of the collet type for high speed lathes and the like.

One of the principal objects of the invention is to simplify the operating mechanism and eliminate the lever yoke and stationary housing of prior collet chucks.

Another object of the invention is to provide a lighter weight less costly chuck for a given work capacity.

Another object is to provide a collet chuck in which the chucking pressures may be varied at will to enable the chucking of almost any type of work under pressures close to the limit therefor without exceeding the limit or distorting the workpiece.

Another object is to more effectively shield the working parts of the chuck against infiltration of metal shavings and other injurious elements.

Another object is to provide a simple means of connecting air pressure to the rotary chuck for operating the same.

An embodiment of the invention is illustrated in the accompanying drawings in which:

Fig. 2 is a vertical longitudinal section of the chuck taken substantially axially thereof on line 2—2 of Fig. 1 and showing the chuck in retracted position;

Fig. 3 is a side elevation of the collet sleeve and pusher showing an operating lever in section;

Fig. 4 is a sectional view similar to Fig. 2 showing the chuck in operative gripping position upon a workpiece;

Fig. 5 is a fragmentary view corresponding to Fig. 3 showing the operating lever in a position corresponding to the chuck position of Fig. 4;

Fig. 6 is a detail view showing a cam slot with an operating lever in a position corresponding to the chuck position of Fig. 4;

Fig. 7 is a detail section showing the passages and valve for application of air pressure to the chuck;

Fig. 8 is a detail view similar to Fig. 6 with the lever in retracted non-chucking position; and Fig. 9 is a detail section showing the construction taken on line 9—9 of Fig. 1.

Figure 1:
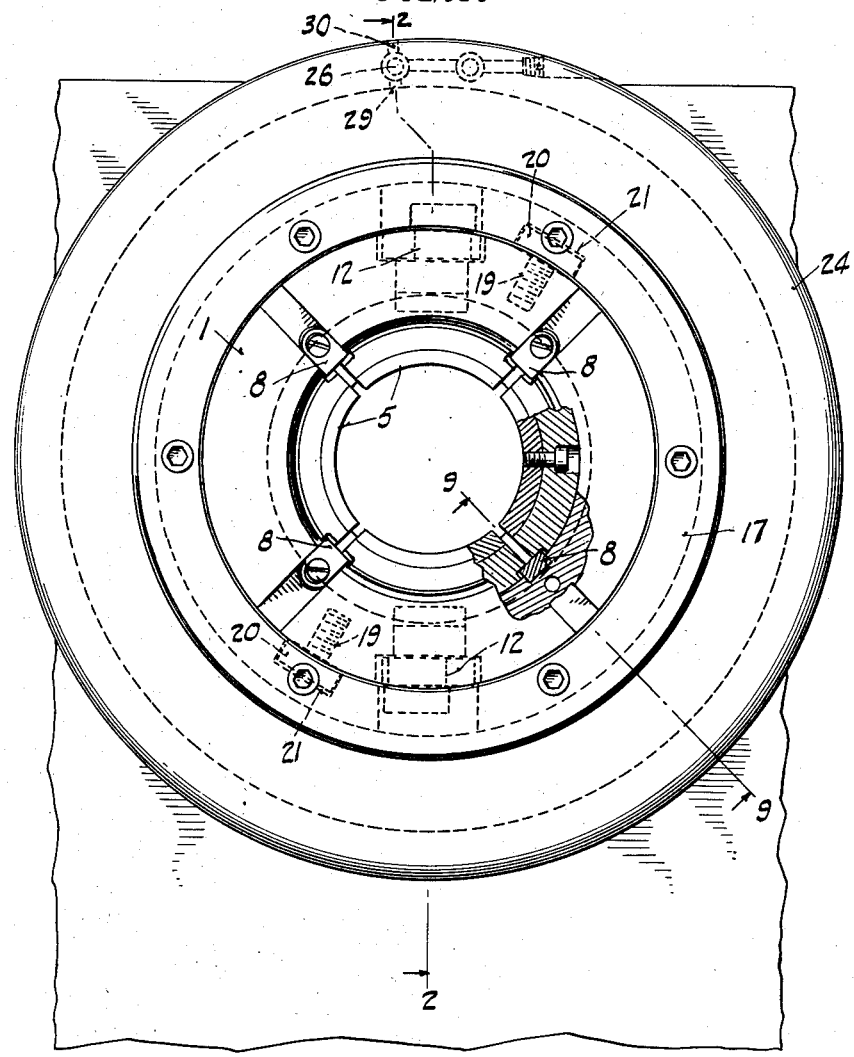
Figure 1 is a front elevation of the chuck with parts broken away and sectioned.

The chuck has a cylindrical chuck body 1 with a flange 2 at its rear end for bolting the same to a hollow rotary lathe spindle 3. The inner bore of the body 1 is of substantially greater diameter than the bore of the spindle 3.

A collet 4 is disposed within body 1 and has its outer end slit to provide radially movable collet fingers 5 with outer surfaces engaging a generally frusto-conical inner surface 6 of the body 1 to effect radial movement of the collet fingers in response to longitudinal movement of collet 4 in body 1.

Circumferential stress on the collet fingers 5 due to the transmission of rotary forces thereby to the workpiece 7 is prevented by means of keys 8 secured to body 1 and disposed in the slots between the collet fingers.

A pusher sleeve 9 is adjustably threaded onto the rear end of collet 4 and serves to operate the latter by moving the same in either direction longitudinally in body 1. For this purpose the sleeve 9 has a recess in its outer surface preferably in the form of a circumferential groove 10 for receiving the inner projections 11 of operating levers 12.

There are preferably two operating levers 12 which are disposed diametrically opposite each other in the chuck and extend generally longitudinally of the body 1 in corresponding recesses 13 in its outer surface.

The inward projection 11 of the rear end of each lever 12 is journaled in a bushing in body 1 and extends therethrough into recess 10 of pusher sleeve 9. The inner end of projection 11 has a flat side which is adapted to engage one wall of the groove 10 and to serve as a cam for pushing the sleeve 9 forwardly to effect operation of the collet fingers 5 against surface 6.

Each lever 12 has an outward projection 14 at its forward end carrying a roller 15 disposed in a recess 16 in a cylindrical slider 17 encircling body 1. One wall of each recess 16 which wall is a part of slider 17 constitutes a step cam 18 adapted to engage roller 15 and to move the latter circumferentially of body 1 in response to longitudinal movement of slider 17, similar to the construction disclosed and claimed in the copending application of the present inventor, Serial No. 717,212, filed December 19, 1946.

The slider 17 is held against rotation relative to body 1 by means of a stud 19 having a roller 20 riding in a groove 21 in the slider 17. Roller 20 is disposed to engage a wall of groove 21 in opposition to the engagement of roller 15 and cam 18, to thereby hold slider 17 against turning under the action of the cam.

According to the present invention the slider 17 is operated directly by air pressure without the intervention of lever mechanism. For this purpose a power cylinder 22 encircles the slide and is formed by a circular cylinder head 23 bolted to flange 2, and a cylinder body and outer end 24 bolted to head 23.

The slider 17 bridges the gap between the ends of the cylinder on the inside and is sealed against the ends to close the cylinder.

The slider 17 has a central circumferential flange 25 extending into the power cylinder and sealed against the outer wall thereof to constitute a piston movable longitudinally in the cylinder in response to air pressure therein.

Air is admitted to and discharged from either end of the cylinder 22 by means of the valve spool 26 operable in a bore 27 in the wall 24 of the cylinder.

Valve bore 27 extends longitudinally of cylinder 22 in the outer wall thereof at the top of the chuck and has a port 28 connecting the same to the rear end of the cylinder and a similar port 29 connecting the same to the front end of the cylinder. A central exhaust port 30 connects bore 27 to the outside atmosphere through the wall 24.

The bore 27 is selectively supplied with compressed air at its opposite ends through nipples 31 and 32, respectively.

When the operator applies the end of a compressed air supply hose 33 to nipple 31, air is admitted to the rear end of bore 27, as shown in Fig. 2, pushing spool 26 to the right and admitting air to the rear end of the cylinder 22 through port 28. At the same time air is exhausted from the front end of cylinder 22 through port 29, bore 27 and exhaust port 30. The piston 25 and its slide 17 are moved forwardly to release levers 12 from the cams 18 and thereby release the workpiece 7.

When a new workpiece 7 is inserted, the operator connects supply hose 33 to nipple 32 which supplies compressed air to the front end of bore 27 moving spool 26 to the left and admitting air to the front end of cylinder 22 through port 29. At the same time air is exhausted from the rear end of cylinder 22 through port 28, bore 27 and exhaust port 30. The piston 25 and its slider 17 are moved rearwardly to apply cams 18 to the corresponding levers 12 and effect gripping of workpiece 7 by collet fingers 5, as shown in Fig. 4.

After chucking the workpiece the air line 33 is disconnected and the chuck is free to turn with the spindle without drag. The steps in cam 18 effectively hold levers 12 to retain the chucking pressure on the workpiece, and there is no danger of possible loss of chucking during rotation of the workpiece. The operator cannot release the chuck until it stops rotating and there is no danger of injury to the work by reason of an accidental or negligent release of the chuck during its rotation.

The seals 34 between slider 17 and the cylinder heads 23 and 24, and the seal 35 between the piston flange 25 and the outer wall of the cylinder 22 effectively prevent escape of air from the power end of the cylinder.

Seals 36 between the opposite ends of pusher sleeve 9 and body 1 effectively seals the same against chips and shavings tending to enter the lever recesses.

A pin 37 locks each lever 12 in place in body 1. For the purpose of machining and assembly, the slider 17 is made with a cylindrical insert 38 in which recesses 16 and 21 are located. A screw 39 secures the slider 17 and insert 38 together. Recesses 16 open radially through member 38, and after the outer part of slider 17 is removed, and pins 37 are removed, the levers 12 may be removed outwardly through the recesses 16. Thereafter member 38 can be removed longitudinally of body 1. Assembly of the parts is in the reverse order from that above referred to.

The invention provides a high power rotary collet chuck in which the slider is driven directly by a piston fixed thereto and operating in a cylinder encircling the chuck.

Various embodiments of the invention may be employed within the scope of the accompanying claims.

I claim:

1. In a collet chuck, a cylindrical rotatably mounted chuck body, a series of collet fingers disposed inside said body and in engagement with a frusto-conical cam surface thereof to operate in unison radially to grip and release a workpiece centrally thereof in response to opposite longitudinal movements of the collet fingers relative to the chuck body, a slider disposed outside the chuck body and encircling the same to rotate therewith, a piston on said slider, a lever journaled in said body and disposed to transmit motion from said slider to said collet fingers to operate the latter, a fluid pressure cylinder carried by the chuck body and encircling said slider and disposed to provide direct fluid pressure against the piston of the slider for operation of the slider in opposite directions, and a valve spool in the wall of said cylinder with a port leading therefrom to admit and discharge air from said cylinder for actuation of the slider piston.

2. In a collet chuck, a cylindrical rotatably mounted chuck body, a series of collet fingers disposed inside said body and in engagement with a frusto-conical cam surface thereof to operate in unison radially to grip and release a workpiece centrally thereof in response to opposite longitudinal movements of the collet fingers relative to the chuck body, a slider disposed outside the chuck body and encircling the same to rotate therewith, a lever journaled in said body and having a roller disposed in a recess in said slider to transmit motion from said slider to said collet fingers to operate the latter, a fluid pressure cylinder carried by the chuck body and encircling said slider and disposed to provide direct fluid pressure operation of the slider, coupling means in the wall of said cylinder disposed to connect a power fluid supply conduit thereto when the chuck is non-rotary to actuate the same and to disconnect the conduit therefrom when the chuck is rotary, and step cam means in said slider to hold the roller of said lever at predetermined collet operating positions to provide gripping of a workpiece by said collet fingers after release of the fluid pressure in said cylinder.

3. In a collet chuck, a cylindrical rotatably mounted chuck body, a series of collet fingers extending from a collet and disposed inside said body and in engagement with a frusto-conical cam surface thereof to operate in unison radially to grip and release a workpiece centrally thereof in response to opposite longitudinal movements of the collet fingers relative to the chuck body, a slider disposed outside the chuck body and encircling the same to rotate therewith, a lever journaled in said body and having a roller at the outer end disposed in a recess in said slider to transmit motion from said slider to said collet fingers to operate the latter, a cam on the inner end of said lever, a sleeve secured to said collet and having a recess therein to receive said cam a fluid pressure cylinder carried by the chuck body and encircling said slider and disposed to provide direct fluid pressure operation of the slider, port connections through the wall of said cylinder for selectively admitting compressed air to either end of said cylinder to effect movement of said slider in a corresponding direction, and step cam means in said slider to actuate said lever to move the collet into chucking position in response to movement of said slider and hold said lever at predetermined collet operating positions to provide gripping of a workpiece by said collet fingers after release of the fluid pressure in said cylinder.

4. In a collet chuck, a cylindrical rotatably mounted chuck body, a series of collet fingers disposed inside said body and in engagement with a frusto-conical cam surface thereof to operate in unison radially to grip and release a workpiece centrally thereof in response to opposite longitudinal movements of the collet fingers relative to the chuck body, a slider disposed outside the chuck body and encircling the same to rotate therewith, a lever journaled in said body and disposed to transmit motion from said slider to said collet fingers to operate the latter, a fluid pressure cylinder carried by the chuck body and encircling said slider and disposed to provide direct fluid pressure operation of the slider, port connections through the wall of said cylinder for selectively admitting compressed air to either end of said cylinder to effect movement of said slider in a corresponding direction, means to hold said lever at predetermined collet operating positions to provide gripping of a workpiece by said collet fingers after release of the fluid pressure in said cylinder, and said port connections being adapted to receive selected connections with a source of air pressure for operating the chuck and which are disconnected therefrom during rotation of the chuck.

VIGO V. KROGH SUNDT.

REFERENCES CITED

The following references are of record in the file of this patent:

UNITED STATES PATENTS

| Number | Name | Date |
|---|---|---|
| 442,230 | Libby | Dec. 9, 1890 |
| 487,245 | Briggs | Dec. 6, 1892 |
| 2,159,162 | Johnson | May 23, 1939 |
| 2,383,094 | Walder | Aug. 21, 1945 |
| 2,418,082 | Marasko | Mar. 25, 1947 |
| 2,454,098 | Schmidt | Nov. 16, 1948 |
| 2,466,651 | Zagar | Apr. 5, 1949 |

FOREIGN PATENTS

| Number | Country | Date |
|---|---|---|
| 391,295 | Great Britain | of 1933 |